Oct. 20, 1931.  C. G. KELLER  1,827,792
VEHICLE WHEEL
Filed March 21, 1928  2 Sheets-Sheet 1

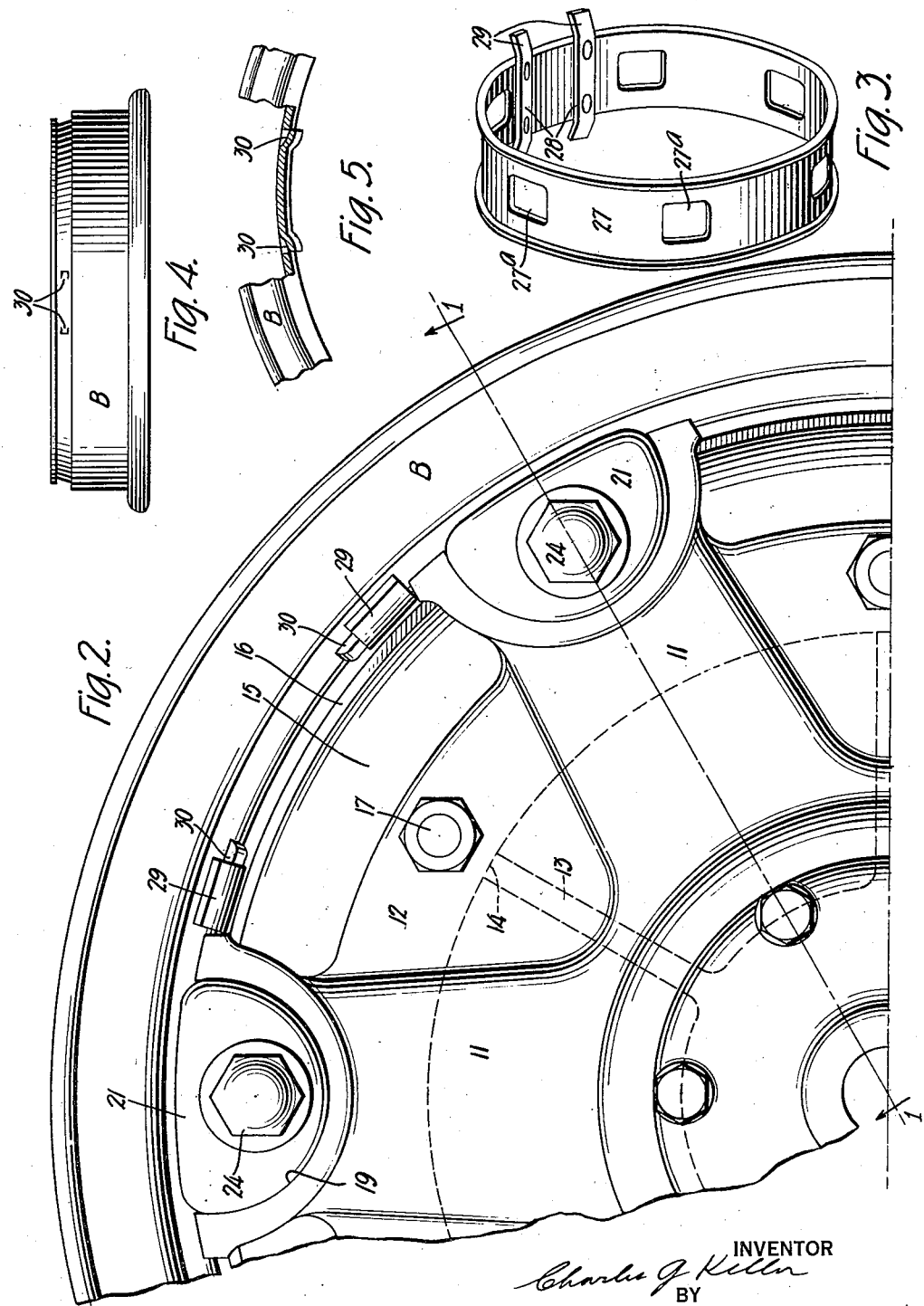

Patented Oct. 20, 1931

1,827,792

UNITED STATES PATENT OFFICE

CHARLES G. KELLER, OF POUGHKEEPSIE, NEW YORK

VEHICLE WHEEL

Application filed March 21, 1928. Serial No. 263,373.

This invention relates to vehicle wheels of the twin tire type, and more particularly to the means employed for spacing the rims and for preventing creeping thereof.

By means of my improved construction it is not necessary to make any change in the body of the wheel in order to prevent the creeping. The spacer performs the double function of spacing and locking against creeping movement and requires but slight change in the construction of the standard rims.

The invention is equally applicable, irrespective of the character of the rim employed.

In the accompanying drawings I have illustrated merely one embodiment of my invention.

In these drawings:

Fig. 2 is an end view;

Fig. 3 is a perspective view of the spacing and locking member;

Fig. 4 is an edge view of one of the two sections of a standard rim with locking projections formed thereon; and Fig. 5 is an enlarged sectional detail of a portion of the rim shown in Fig. 4.

Figure 1:
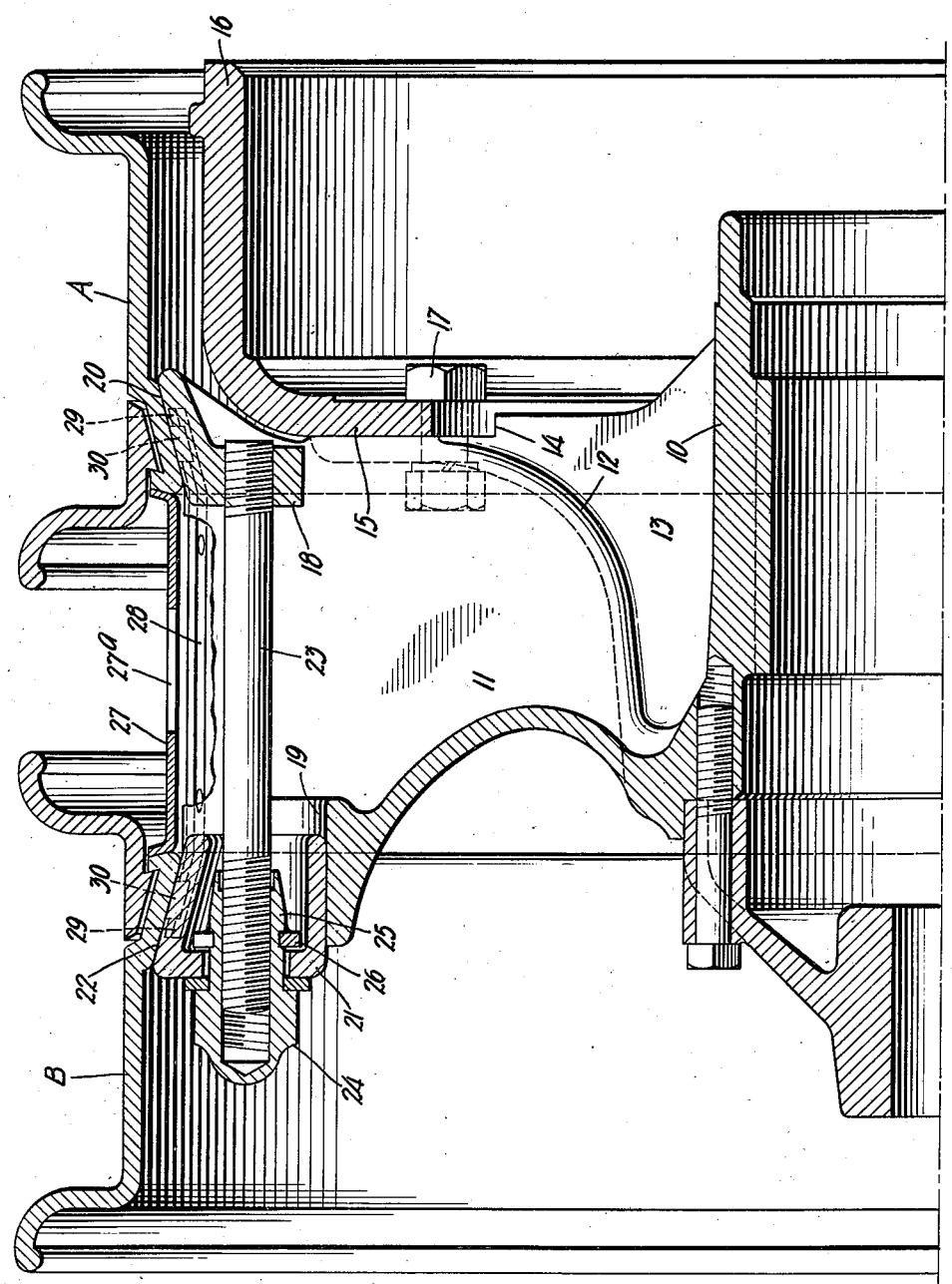
Fig. 1 is a radial longitudinal section through a portion of a wheel.

I have illustrated my invention as applied to a type of wheel involving various novel features of construction which are claimed in prior and copending applications. This wheel includes a hub 10 with a plurality of spokes 11 cast integral therewith and spaced apart at their outer ends, there being no felly employed. Each spoke is substantially U-shaped in cross-section, and between adjacent spokes there is a web 12 also cast integral with the spokes and the hub, and extending from the outer side of the inner end of the spokes to the outer end at the inner side. This web thus extends in a direction having radial and axial components, and is preferably curved and united to the free edges of the side walls of the spokes. This web is pressed by radially disposed partitions or flanges 13 between adjacent spokes, and extending from the hub to the web. These partitions or flanges extend axially to a slightly greater distance than does the web, and present shoulders 14 which engage with and center the flange 15 of a brake drum 16. The shoulders hold the brake drum against any radial movement, while clamping bolts 17 extending through the flange 15 of the brake drum and the outer portion of the web 12 hold the brake drum against axial or circumferential movements.

Each spoke at its outer end has a bridge piece 18 at the inner or open side of the passage through the spoke, and an approximately semi-cylindrical recess or passageway 19 in the outer or closed side of the spoke. The bridge piece 18 presents an inclined surface 20 acting as a seat for the inner rim A, while the passage or recess 19 has a rim clamping member 21 movable in a direction parallel to the axis of the wheel, and presenting an inclined surface 22 for engaging the outer rim B. The bridge piece 18 also carries a clamping bolt 23 which extends into or through the recess 19 and through the rim clamping member 21. On the outer end of this bolt is a nut 24 which is preferably of the cap type with a long threaded section and a shank 25 projecting into the interior of the clamping member 21 and held therein by a washer or other projection 26. The opening in the clamping member is slightly larger than the shank so that the clamping member has limited radial and limited axial movements in respect to the nut and its shank, but the nut may freely rotate in forcing the clamping member into or out of position.

All of the parts so far described are the subject matter of other applications, and although preferable features, they may be modified within very wide limits so far as it involves the construction, operation, or utility of the main features of the present invention.

In carrying out my present invention there is provided an annular rim spacing member which is illustrated as a cylindrical band 26 which may be either solid or split, and of such diameter that it does not engage either the rim supporting surfaces 20 and 22 or the parts presenting such surfaces, although it might have axial guiding movements on such parts. This member is free to float axially, and in putting on the rims it is engaged by the outer rim B, it acts on the inner rim A to force the latter into place, it acts as a stop for the rim B when the rim A is in place, and it forms a fixed spacer to hold the rims in predetermined spaced relationship. The member may be made longer or shorter as desired, depending upon the size of the tires used and the desired spacing between them. The member has apertures 27a therethrough which are placed opposite the outer ends of the several spokes so that in operation the spokes act as a fan or centrifugal blower and air is sucked in from the inner side of the wheel beneath the flange 15 to cool the brake drum and brake parts, and is forced radially through the several spokes and out the outer ends thereof and through the apertures 27a between the tires to cool the latter. The side edges of the spacing member 27 may be provided with flanges to facilitate engagement with the rims or to strengthen and reinforce such edges.

As the rims in the construction illustrated have annular inclined surfaces for engaging the inclined surfaces 20 and 22 and the wheel, a loosening of the parts might permit a creeping of the rims. This is prevented by means of the novel construction of the rim spacing member. As illustrated this member has a pair of transverse cleats 28 secured to the inner surface, and these cleats have projecting ends 29 which engage with the sides of the spokes either at the bridge piece 18 or at the portion having the semi-cylindrical recess 19, or with both, so that when the rim spacing member is placed in position it is prevented from creeping or having any relative circumferential movement in respect to the wheel.

The rim is provided with a pair of lugs or projections which engage with these lugs or cleat ends 29 so that the rim cannot creep or rotate in respect to the rim spacing member. The projection on the rim may be formed in various different ways. For instance, I have shown slightly U-shaped slots formed in the inclined surface of each rim forced downward slightly to form lugs 30 presenting opposite circumferentially facing shoulders or abutments. These are so spaced that they engage between the cleat ends or spacer projections 30, as shown particularly in Fig. 2.

Instead of forming these parts integral, it is, of course, evident that they might be pins or other forms of projections riveted or welded to the rim.

By the use of the two projections 29 and the two projections 30, each rim is prevented from rotating in respect to the spacer, and the spacer is prevented from rotating in respect to the wheel.

Certain features of construction disclosed in this application, particularly regarding the air circulating features and the spoke construction, are disclosed and broadly claimed in my copending application Serial No. 154,092, filed Dec. 11, 1926. The rim attaching means is more broadly claimed in my copending application 182,199, filed April 9, 1927.

Having thus described my invention, what I claim as new and desire to secure by Letters Patent is:

1. A vehicle wheel having a plurality of spokes, a pair of removable rims, each having a circumferentially facing shoulder, an annular rim-spacing member having projections for engaging two adjacent spokes to prevent rotation of said member in respect to the spokes, said projections also engaging with said shoulders to prevent relative rotation of the rims and the wheel.

2. A vehicle wheel having a pair of removable rims, a series of spokes, each presenting a series of rim-supporting surfaces for one rim and a separate series of rim-supporting surfaces for the other rim, one series being movable axially in respect to the other series, an annular non-expansible removable rim-spacing member between said surfaces for abutting engagement with the rims and having a pair of projections extending substantially axially beyond the edge of said member for engaging with the spokes to prevent rotation of said member in respect to said spokes, each of said rims having a pair of projections for engaging the projections of said spacing member.

3. As an article of manufacture, an annular rim-spacing member adapted to be mounted on a wheel between a pair of removable rims and having a pair of transverse cleats with the ends extending beyond the side edges of the member, said cleats being adapted to engage with the wheel and with the rims to lock the rims, member and wheel against relative rotation.

4. A vehicle wheel having spokes, each presenting a series of spaced inclined rim seats and a second series of spaced inclined axially movable rim seats, a pair of rims, each having an inwardly extending portion presenting an inclined seat and a shoulder, and a non-expansible spacer ring having axially abutting engagement with said shoulders and supported solely by said engagement, means for moving said second mentioned seats axially, whereby the inclined surfaces of the rims are forced axially onto said seats, and held in parallelism, said ring having a pair of laterally extending projections for engaging between a pair of adjacent spokes to prevent creeping of the ring, and each rim having a pair of projections engaging the projections of said ring to prevent creeping of said rims on their seats and in respect to said ring.

5. A vehicle wheel having a series of spokes, a pair of rims, a pair of axially spaced surfaces for engaging with said rims, and constituting the sole supports for said rims, an annular removable rim-spacing member for abutting engagement with the rims and having transverse cleats with projecting ends for engaging the spokes, said member being supported solely by said rims, and said rims each having projections for engaging the ends of said cleats to interlock the rims and member and prevent relative rotation.

Signed at New York in the county of New York and State of New York this 19th day of March, A. D. 1928.

CHARLES G. KELLER.